US008007043B1

(12) United States Patent
Vuong

(10) Patent No.: US 8,007,043 B1
(45) Date of Patent: Aug. 30, 2011

(54) CHILD CAR SEAT WITH ENHANCED FEATURES

(76) Inventor: Thien Vuong, San Jose, CA (US)

( * ) Notice: Subject to any disclaimer, the term of this patent is extended or adjusted under 35 U.S.C. 154(b) by 152 days.

(21) Appl. No.: 12/563,866

(22) Filed: Sep. 21, 2009

Related U.S. Application Data

(60) Provisional application No. 61/192,498, filed on Sep. 19, 2008.

(51) Int. Cl.
*A47D 1/10* (2006.01)
*A47C 7/72* (2006.01)

(52) U.S. Cl. ........... 297/250.1; 297/256.16; 297/217.3; 297/217.4; 297/217.6

(58) Field of Classification Search ............. 297/217.3, 297/217.4, 217.6, 250.1, 256.16
See application file for complete search history.

(56) References Cited

U.S. PATENT DOCUMENTS

| | | | |
|---|---|---|---|
| 4,748,972 A | 6/1988 | Hasegawa | |
| 4,979,777 A | 12/1990 | Takada | |
| 4,982,996 A | 1/1991 | Vottero-Fin et al. | |
| 5,147,109 A | 9/1992 | Jolly | |
| 5,179,447 A | 1/1993 | Lain | |
| 5,464,381 A * | 11/1995 | Wilson ................. | 297/250.1 X |
| 5,482,352 A | 1/1996 | Leal et al. | |
| 5,624,156 A | 4/1997 | Leal et al. | |
| 5,760,873 A * | 6/1998 | Wittek ................. | 297/217.3 X |
| 5,838,808 A | 11/1998 | Prosser | |
| 6,025,902 A * | 2/2000 | Wittek ................. | 297/217.3 X |
| 6,126,233 A * | 10/2000 | Gaetano et al. ........... | 297/217.6 |
| D483,576 S | 12/2003 | Kassai et al. | |
| D487,640 S | 3/2004 | Chen | |
| 7,039,207 B1 | 5/2006 | Elrod et al. | |
| D537,640 S | 3/2007 | Spence et al. | |
| 7,703,848 B1* | 4/2010 | Cochran et al. ........... | 297/256.16 |
| 7,722,118 B2* | 5/2010 | Bapst et al. ........... | 297/256.16 X |
| 7,883,072 B2* | 2/2011 | Kondo et al. ........... | 297/217.4 X |
| 2005/0151401 A1* | 7/2005 | Evans ...................... | 297/250.1 |
| 2005/0275260 A1* | 12/2005 | Patterson et al. ........ | 297/256.16 |
| 2007/0296254 A1* | 12/2007 | Kahn ...................... | 297/256.16 |
| 2010/0320819 A1* | 12/2010 | Cohen et al. ............... | 297/217.4 |

* cited by examiner

*Primary Examiner* — Rodney B White
(74) *Attorney, Agent, or Firm* — Montgomery Patent and Design; Robert C. Montgomery

(57) ABSTRACT

A child car seat with electronic entertainment features is herein disclosed, comprising an integral sound system with pre-recorded sounds or music, and a pair of speakers embedded in the car seat near the child's head. Also, a plurality of flashing lights that can be synchronized with the music is provided along a perimeter region. Finally, a vibrating mechanism in the base of the seat may operate in a synchronous manner with the music or provide a soothing and comforting effect thereto the child to lull the child to sleep. The seat is capable of manual or automatic operation as selected using a front-mounted switch control panel or may be controlled remotely via a handheld wireless controller. The car seat is powered by connection to a cigarette lighter socket within the vehicle.

13 Claims, 4 Drawing Sheets

CHILD CAR SEAT WITH ENHANCED FEATURES

RELATED APPLICATIONS

The present invention was first described in and claims the benefit of U.S. Provisional Application No. 61/192,498, filed Sep. 19, 2008, the entire disclosures of which are incorporated herein by reference.

FIELD OF THE INVENTION

The present invention relates generally to child car seats, and more particularly, to a battery-operated child car seat that protects a child and entertains and stimulates the child by integral electronic entertainment features.

BACKGROUND OF THE INVENTION

For parents and others involved in raising children, nothing even comes close to the importance placed on ensuring the child's safety at all times, day and night. This notion is perhaps best demonstrated in the safety precautions taken while traveling in an automobile. By law, small children are to be placed in safety seats at all times while traveling in an automobile. Various types of child car seats and restraints exist to reduce the risk of injury to a child in the event of a vehicle accident or similar event which can occur while driving. While car seats provide the best safety for the child that technology can provide, these seats lack any entertainment or amusement for the child. In fact, the immobilization of the child may cause temper tantrums, crying, whining and the like, much to the dismay of the driver or fellow passengers.

Devices have attempted to provide entertainment and amusement to children while riding in a vehicle. These attempts can be seen by example is several U.S. patents, including U.S. Pat. Nos. 5,147,109, issued in the name of Jolly, which describes a car seat with an audible reproduction mechanism mounted within a base portion; 5,482,352, issued in the name of Leal et al., which describes a child seat with a compartment for carrying an audio source; 5,624,156, issued in the name of Leal et al., which describes a child safety seat with entertainment system having speakers and an audio source; and 7,039,207, issued in the name of Elrod et al., which describes an entertainment and pacification system for a car seat having speakers, audio sources, and an anti-noise audio system.

Additionally, ornamental designs for child seats exist, particularly, U.S. Pat. Nos. D 483,576, issued in the name of Kassai et al.; D 487,640, issued in the name of Chen; and D 537,640, issued in the name of Spence et al. However, none of these designs are similar to the present invention.

While these attempts fulfill their respective, particular objectives, each suffers from one or more of the disadvantages or deficiencies. Accordingly, there is a need for a means by which infants and children placed in car seats can be provided with a means to entertain, amuse, and soothe them. The development of the present invention substantially departs from the conventional solutions and in doing so fulfills this need.

SUMMARY OF THE INVENTION

In view of the foregoing references, the inventor recognized the aforementioned inherent problems and observed that there is a need for a child safety car seat provided with various electronic components which makes car travel enjoyable for both a child and thus, the object of the present invention is to solve the aforementioned disadvantages and provides for this need.

Another object of the present invention is to provide an apparatus that reduces the stress on a driver or passengers of an automobile caused by a non-entertained and fussy child.

Another object of the present invention is to provide an apparatus that provides various means of audible reproduction which sooth a child.

Another object of the present invention is to provide an apparatus that provides visual stimulus to a restrained child.

Another object of the present invention is to provide an apparatus that provides an integral means of vibration to sooth and comfort the child.

Another object of the present invention is to provide the child car seat with various means of operational control and electrical power.

Another object of the present invention is to provide a durable, safe, and effective child restraint for use while traveling in automobiles.

To achieve the above objectives, the present invention provides a child car seat with entertaining electronic effects including sound, illumination, and vibration. The apparatus generally comprises a car seat assembly having a base portion and a seat portion, a pushbutton housing, a power adapter, a pair of speakers, a handle, a plurality of lights, a vibration means, a remote controller, and a wireless signal receiver.

In a preferred embodiment a feature of the present invention is a music system that provides playback of pre-recorded or externally received music through a pair of speakers embedded in a car seat backrest portion that is adjacent to an occupying child's head.

Another feature of the present invention is a plurality of flashing color lights arranged along outer edges that provide various flashing illuminated effects.

Another feature of the present invention is a vibrating mechanism located within a base portion of the seat that produces vibration effects, which sooths and comforts the child.

Another feature of the present invention is functional control provided manually by using front-mounted pushbuttons or using a wireless remote controller.

Another feature of the present invention is to provide electrical power via a cigarette lighter adapter, thereby utilizing the vehicle's 12-volt electrical system.

The present invention provides a method of utilizing the apparatus that provides young children multiple activities to amuse them with while traveling in an automobile providing a more enjoyable trip for them and the driver and other passengers.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
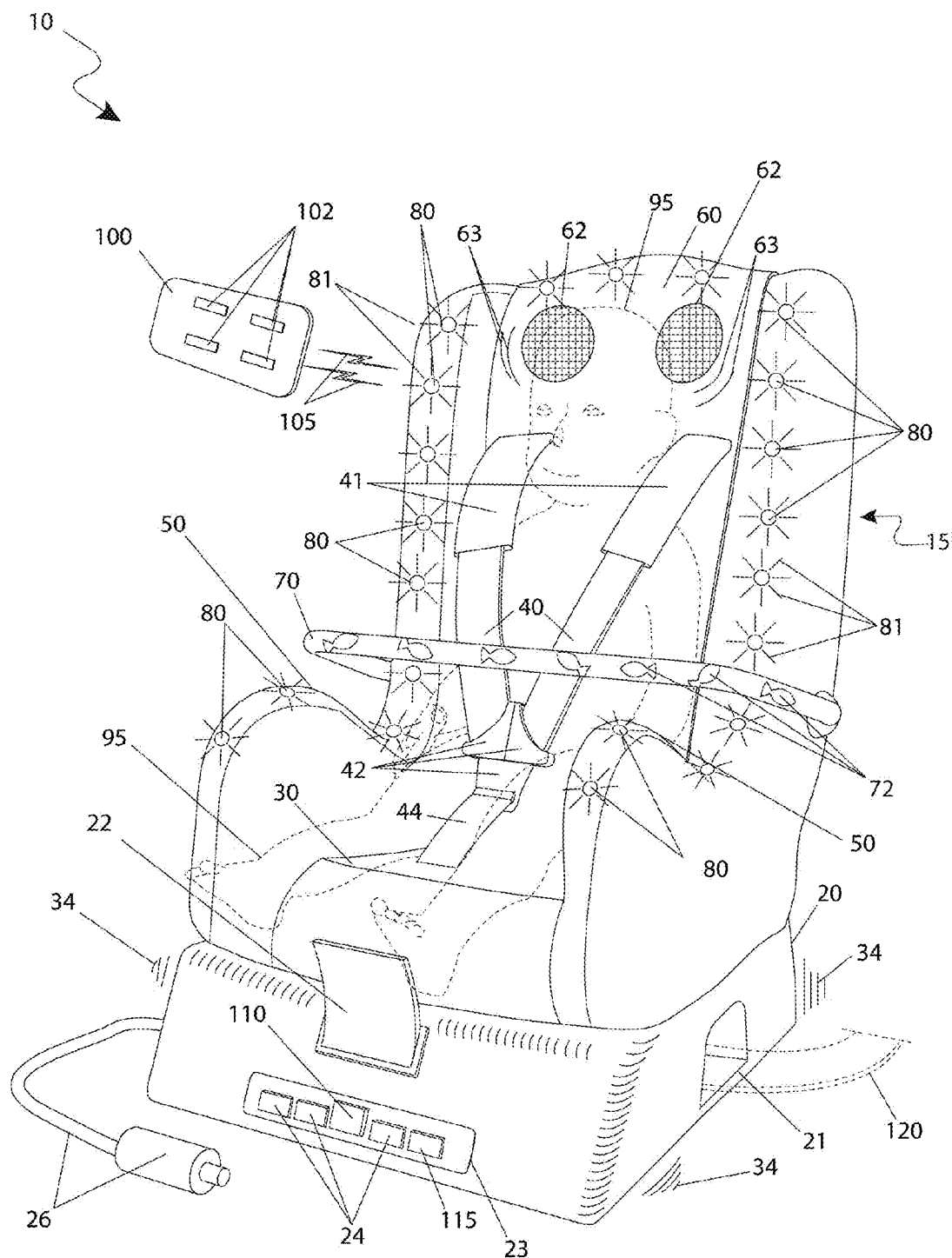
FIG. 1 is a perspective view of a child car seat with enhanced features 10, according to a preferred embodiment of the present invention.

DESCRIPTIVE KEY 10 child car seat with enhanced features
15 car seat assembly
20 base portion
21 seat belt tunnel
22 release clasp
23 pushbutton housing
24 pushbutton
26 power adapter
28 control module
30 seat portion
32 vibration means
34 vibration
35 release catch
38 first connector
39 second connector
40 shoulder strap
41 shoulder strap padding
42 strap latch
44 crotch strap
50 arm rest portion
60 backrest portion
61 foam filling
62 speaker
63 sound
70 handle
72 decorative indicia
80 light
81 illumination
95 child
100 remote controller
102 remote controller button
105 signal
110 signal receiver
115 interface port
120 seat belt
130 first rear latching feature
132 second rear latching feature
136 first front latching feature
138 second front latching feature
150 wiring

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a child car seat with enhanced features (herein described as the "apparatus") 10 comprising entertaining electronic effects including sound 63, illumination 81, and vibration 34. A music system provides playback of pre-recorded or externally received music 63 through a pair of speakers 62 embedded therein a car seat backrest portion 60 being adjacent thereto an occupying child's head 95. A plurality of flashing color lights 80 arranged along outer edges provide various flashing illuminated effects 81. A vibrating mechanism 32 located within a base portion 20 of the apparatus 10 produces vibration effects 34, which sooths and comforts the child 95. The features of the apparatus 10 are controlled manually using front-mounted pushbuttons 24 or from a distance using a wireless remote controller 100. The apparatus 10 is powered via a cigarette lighter adapter 26, thereby utilizing a vehicle's 12-volt electrical system.

Figure 2:
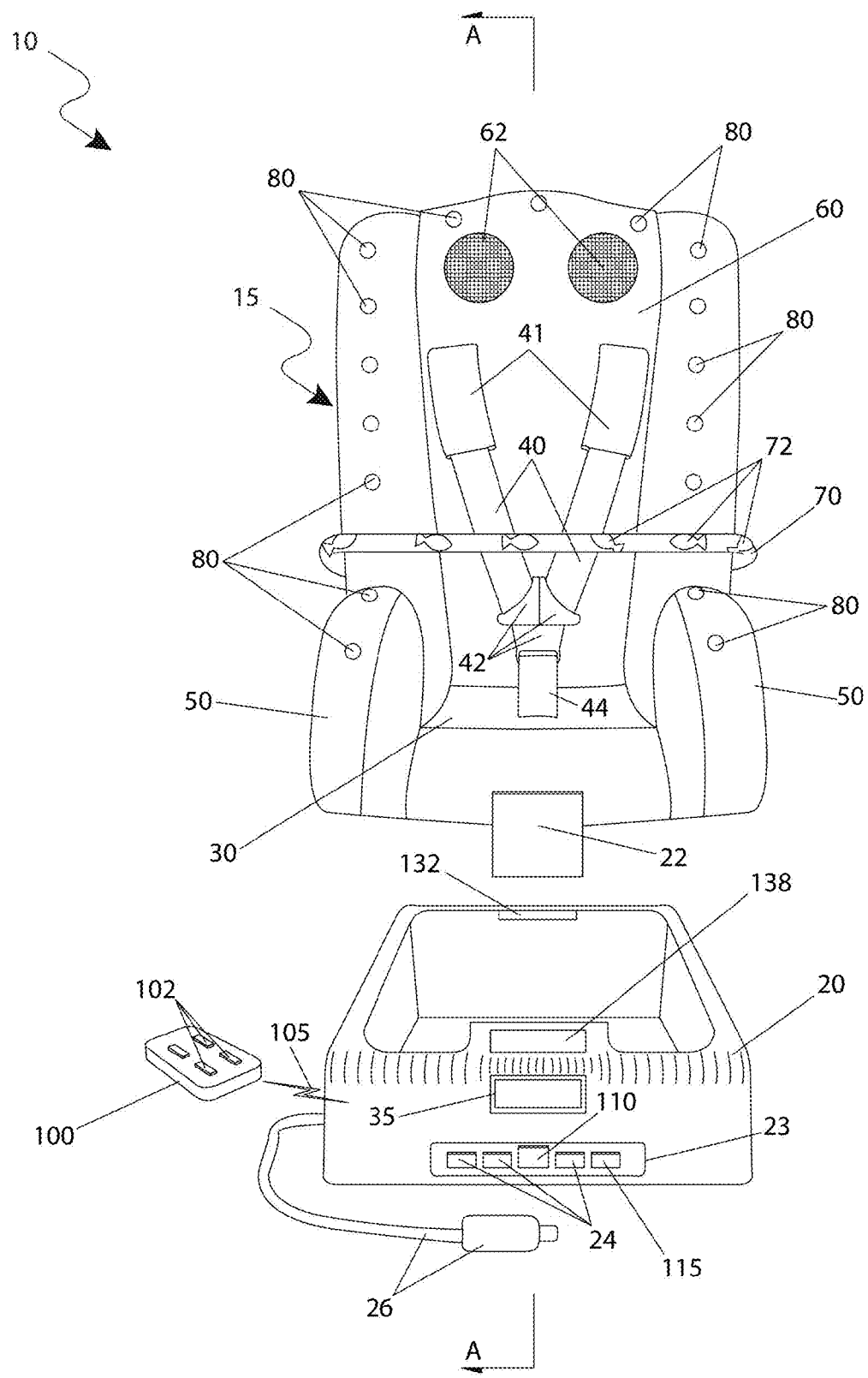
FIG. 2 is a front view of the child car seat with enhanced features 10, according to a preferred embodiment of the present invention.

Referring now to FIGS. 1 and 2, a perspective view and a front view of the apparatus 10, according to the preferred embodiment of the present invention, are disclosed. The apparatus 10 comprises a car seat assembly 15, a pushbutton housing 23, a power adapter 26, a pair of speakers 62, a handle 70, a plurality of lights 80, a remote controller 100, and a wireless signal receiver 110.

The apparatus 10 is depicted here comprising a two-piece unit comprising a hard plastic base portion 20 and a removably attached car seat assembly 15. The base portion 20 provides attachment thereto a vehicle using an existing seatbelt 120. The apparatus 10 further comprises standard and expected features being similar to those found on many popular car seat models such as, but not limited to: a seat belt tunnel 21, a foam-filled 61 seat portion 30, a pair of shoulder straps 40 having padded portions 41, a strap latch 42, a crotch strap 44, a pair of arm rests 50, a foam-filled 61 backrest portion 60, and a carrying handle 70. The seat portion 30 provides manual detachment means therefrom the base portion 20 via a release clasp 22 mechanism. The shoulder straps 40 are envisioned to be affixed securely thereto the seat 30 and back rest 60 portions via common strapping elements including a strap latch 42 and a restraining crotch strap 44 in an expected manner. The car seat assembly 15 is envisioned to be made using common plastic, vinyl, and fabric outer materials introduced in a variety of different colors and patterns, and an inner foam filling 61. In use, the base portion 20 is secured thereto the vehicle via routing of an existing seatbelt 120 therethrough a seatbelt tunnel feature 21 being integrally-molded thereinto the base portion 20 as seen in FIG. 1.

The car seat assembly portion 15 further comprises particular enhancements designed to entertain and/or calm a child 95 while seated therein a vehicle. The base portion 20 further comprises an integral pushbutton housing 23 therealong a front surface providing a user manual control of the entertaining enhancements of the apparatus 10. The pushbutton housing 23 is envisioned to comprise electronic components such as, but not limited to: a plurality of pushbuttons 24, a remote controller signal receiver 110 and a software interface port 115. The pushbuttons 24 comprise common momentary contact-closure devices providing various input signals thereto an internal control module 28 located therewithin the base portion 20 (see FIG. 3). The pushbuttons 24 provide manual activation of various functions such as, but not limited to: ON/OFF switching, selection of various sleep and entertainment modes, different sound 63 and illumination effects 81, menu and routine selection, selection of sounds and music 63, volume control, illumination 81 brightness control, and the like.

The apparatus 10 receives electrical power via the power adapter 26, thereby utilizing an available vehicle electrical system to produce said entertaining sounds 63, illumination 81, and vibrations 34. The sounds and music 63 are to be locally broadcasted thereto the child 95 via a pair of common speakers 62. Said sounds and music 34 are envisioned to comprise various pre-recorded sounds 63 such as, but not limited to: music, calming nature sounds, stories, nursery rhymes, animal sounds, and the like. Said sounds and music are to be received therefrom sound-generating microprocessor-based circuitry providing common memory and digital sound conversion functions and being integral thereto the aforementioned control module 28 (see FIG. 3).

The lights 80 provide an attractive visual illumination 81 effect to further entertain the child 95. The lights 80 comprises a linear or random arrangement of variegated and colorful light bulbs located along forward facing surfaces and perimeter edge portions of the car seat assembly 15. Said lights 80 comprise common illuminating devices such as light-emitting diodes (LED), incandescent bulbs, or other current illumination 81 technology. The lighting 80 and the sounds emitted therefrom the speakers 62 are to be capable of operating in either an independent manner or in a synchronous manner being responsive thereto each other so as to respond thereto certain sound elements 63 such as a musical beat, a musical rhythm, sound amplitude, and the like. The backrest portion 60 provides a pivoting attachment means thereto a "U"-shaped handle 70 which extends therefrom opposing outer side surfaces and extends laterally in front of the child 95 in a protective manner as well as pivoting upwardly to provide a grasping and carrying means. Said handle 70 further provides the child 95 with visually stimulating surface features such as colorful printed and/or molded decorative indicia 72 depicting symbols such as, but not limited to: animal figurines, cartoon characters, alphanumeric characters, and the like, being arranged along outer surfaces thereupon.

The seat portion 30 further comprises an internal motorized vibration means 32 being capable of conducting vibrations 34 having a variety of frequencies and corresponding amplitudes. The vibration means 32 is to be capable of also operating in a synchronous manner therewith the aforementioned sound and lighting portions of the apparatus 10 to enhance entertainment of the child 95. Furthermore, the vibration means 32 may also be capable of providing a continuous vibration mode, thereby providing a soothing vibration 34 to comfort the child 95 and/or encourage the child 95 to sleep.

Figure 3:
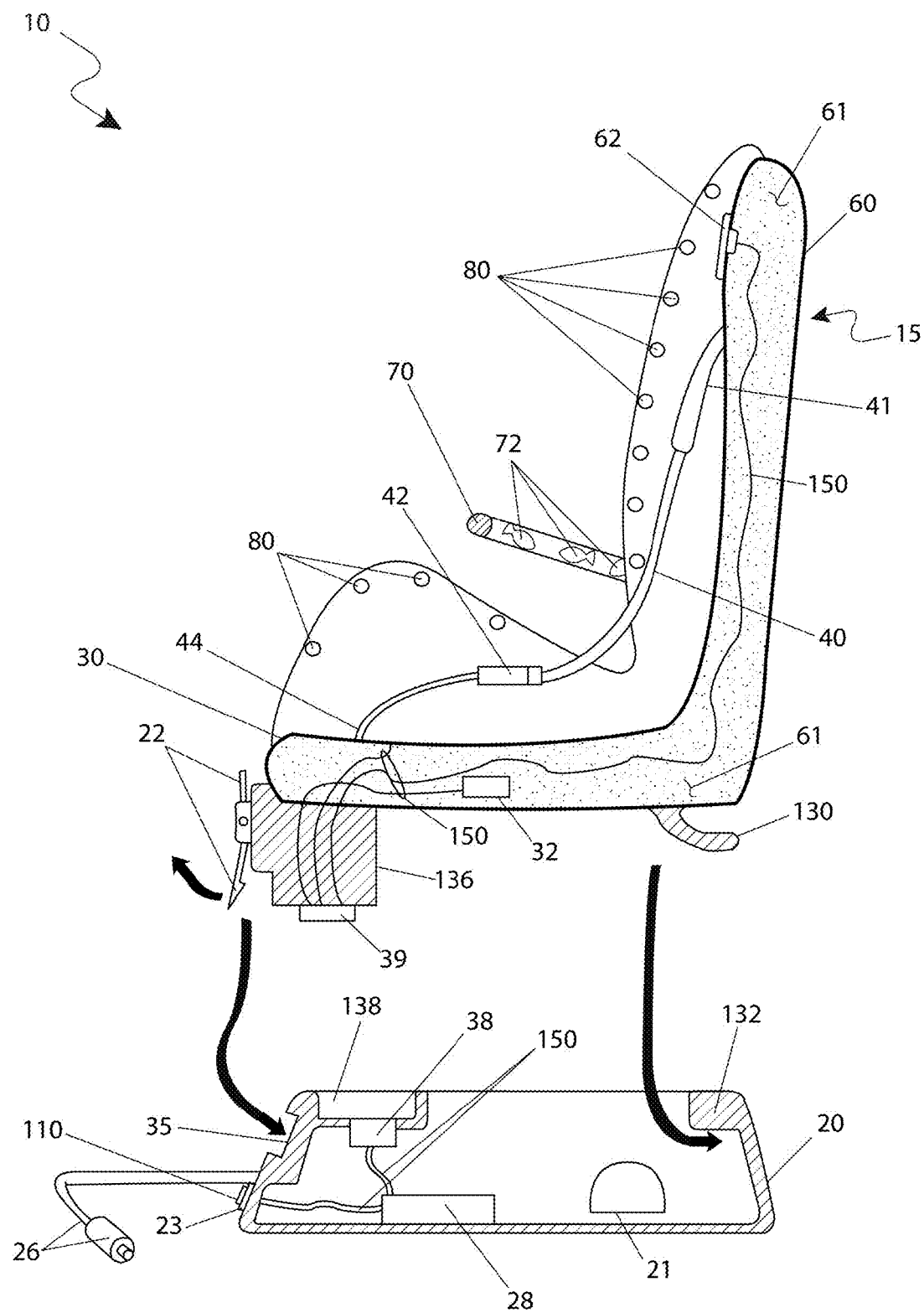
FIG. 3 is a section view of the child car seat with enhanced features 10 taken along section line A-A (see FIG. 2), according to a preferred embodiment of the present invention; and, FIG. 4 is an electrical block diagram of the child car seat with enhanced features 10, according to a preferred embodiment of the present invention.

Referring now to FIG. 3, a section view of the apparatus 10 taken along section line A-A (see FIG. 2), according to a preferred embodiment of the present invention, is disclosed. The apparatus 10 provides quick and easy loading and unloading of the child seat assembly 15 therefrom the base portion 20 by a user or care giver. The apparatus 10 comprises a release clasp 22, a release catch 35, a first rear latching feature 130, a second rear latching feature 132, a first front latching feature 136, and a second front latching feature 138. The latching features 130, 132, 136, 138 comprise geometrically matching pairs of plastic-molded interlocking and captivating stationary elements which are to be sequentially inserted thereinto each other and subsequently retained therein an engaged state via the spring-loaded release clasp 22 being engaged therein the release catch 35. The release clasp 22 and release catch 35 are located therealong front surfaces of the car seat assembly 15 and base portions 20, respectively. However, it is understood that the method utilized to latch the car seat assembly 15 thereto the base portion 20 is not limited to the described embodiment, and a person skilled in the art will appreciate that many other latching mechanisms, common in the industry, may be utilized without deviating from the basic concept, and as such should not be interpreted as a limiting factor of the apparatus 10.

The apparatus 10 further provides a plurality of electrical connections therebetween the child seat assembly 15 and the base portion 20 via vertical mechanical engagement of a male first connector 38 and a female second connector 39. Said connectors 38, 39 comprise multiple pin-out construction and male/female molded features. Furthermore, said connectors 38, 39 are arranged so as to be pre-aligned and engaged in a coincidental engaging motion therewith the aforementioned latching features 130, 132, 136, 138 when installing the child seat assembly 15 thereto the base portion 20. Said connectors 38, 39 provide enabling electrical circuitry therefrom the internally mounted control module 28 located therewithin the base portion 20, thereto the aforementioned vibration means 32, speakers 62, and lights 80 via common internal wiring 150 (see FIG. 4).

Figure 4:
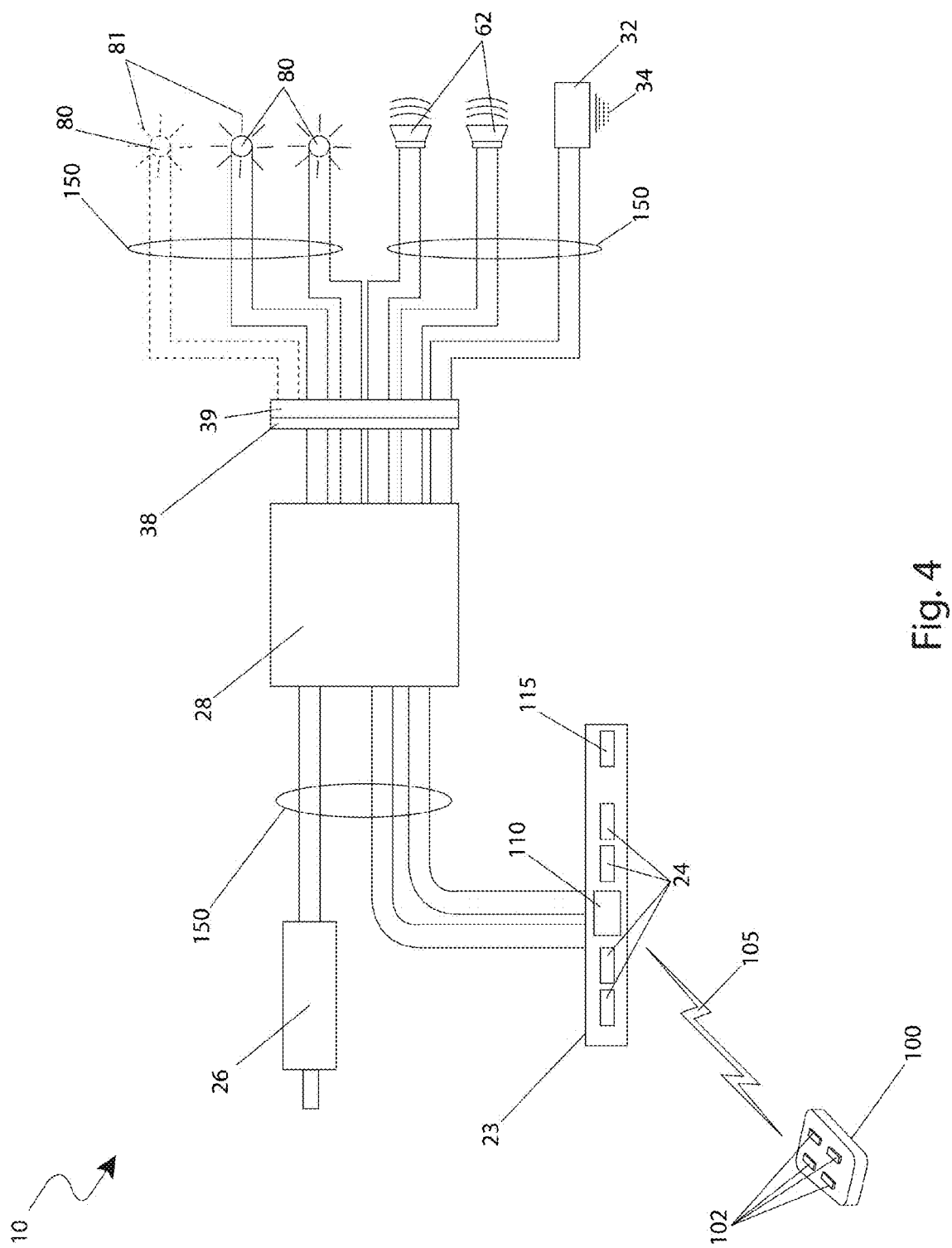

Referring now to FIG. 4, an electrical block diagram of the apparatus 10, according to the preferred embodiment of the present invention, is disclosed. The apparatus 10 receives a 12-volt current therefrom a vehicle's 12-volt system via connection therewith a common cigarette lighter socket power adapter 26. Said electric power is subsequently conducted thereto the control module 28 via internal wiring 150 within the base portion 20. The control module 28 comprises a common plastic or metal electronic enclosure providing a protection and durable mounting means thereto internal electrical and electronic equipment and components such as, but not limited to: printed circuit boards, relays, memory chips, embedded software, sound processing circuitry, input/output signal processors, and the like. The control module 28 is in electrical communication therewith the pushbutton housing 23 which comprises a plurality of electronic input devices along an external surface including a plurality of pushbuttons 24, a signal receiver 110, and an interface port 115. In use, the pushbuttons 24 are manually pressed by a user to provide selection and configuration of various sound 63 and illumination 81 functions of the apparatus 10 based upon active software and hardware configurations therewithin the control module 28. The signal receiver 110 works in conjunction therewith a remote controller 100, thereby providing a user alternate wireless activation of said sound and lighting functionality via a transmitted and received radio frequency (RF) or inferred (IR) signal 105. The remote controller 100 comprises a plurality of remote controller buttons 102 along a front surface which emulate similar functions as the aforementioned pushbuttons 24. The remote controller 100 is especially convenient in such cases as when the user is located at a distance therefrom the child 95 or while operating the vehicle. The control module 28 further provides a plurality of enabling electrical output signals via internal wiring 150, being connected and conducted thereto the child seat assembly 15 therethrough the aforementioned first 38 and second 39 connectors. Said enabling electrical output signals are in turn in electrical communication therewith the aforementioned speakers 62, lights 80, and vibration means 32. The control module 28 further comprises user configurable microprocessor-based software providing various sound 63, vibration 34, and illumination 81 effects designed to entertain and/or sooth the child 95 while he/she occupies the car seat assembly 15. The pushbutton housing 23 is also envisioned to provide an external interface port 115 capable of establishing digital communication therebetween the control module 28 and various peripheral devices such as computers, MP3 players, and the like, thereby enabling downloading of data such as, but not limited to: music, sounds, stories, operational software, and the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in FIGS. 1 and 2.

The method of utilizing the apparatus 10 may be achieved by performing the following steps: installing the base portion 20 of the apparatus 10 therewithin a vehicle in a forward-facing orientation by routing an existing vehicle seatbelt 120 therethrough the seatbelt tunnel feature 21 of the base portion 20; latching and tightening said vehicle seatbelt 120 in a normal manner; securing the child seat assembly 15 thereto the base portion 20, if not previously installed, by initially engaging the rear latching features 130, 132; and engaging the front latching features 136, 138, wherein the first connector 38 couples therewith the second connector 39; verifying that the spring-loaded release clasp 22 is latched securely thereto the release catch 35; loading and securing a child 95 thereinto the car seat assembly 15 by securing the shoulder straps 40, strap latch 42, and crotch strap 44 thereto said child 95 in a conventional manner; plugging the power adapter 26 thereinto a suitable 12-volt DC receptacle therewithin the vehicle; pressing the pushbuttons 24 to activate, configure, select, and activate desired sound 63, illumination 81, and vibration 34 effects of the apparatus 10; proceeding to drive the vehicle while utilizing the entertaining features of the apparatus 10, thereto a destination in a normal manner; switching or reconfiguring the sound 63, illumination 81, and vibratory 34 effects of the apparatus 10 using the pushbuttons 24 or the remote controller 100 as desired; deactivating the apparatus 10 upon reaching one's destination, or until operation is once again needed using said push buttons 24; and, providing enjoyable and entertaining effects of the apparatus 10 thereto an occupying child 95 as well as experiencing improved operation of a vehicle by a care giver while utilizing the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A child car seat with enhanced entertainment features comprising:

a car seat assembly including a base portion and a seat portion removably attached thereto, said base portion including a pushbutton housing attached thereto;

a plurality of speakers coupled to said seat portion for emitting sounds and vibrations;

an internal motorized vibration mechanism situated within said base portion for generating vibrations having a variety of frequencies and corresponding amplitudes;

a plurality of lights including an arrangement of variegated light bulbs located along forward facing surfaces and perimeter edge portions of said seat portion respectively; and, an internal control module communicatively coupled to said speakers, said internal motorized vibration mechanism and said lights respectively;

wherein said internal motorized vibration mechanism synchronously operates with said lights and speakers respectively.

2. The child car seat with enhanced entertainment features of claim 1, wherein said pushbutton housing comprises:

a plurality of pushbuttons for generating entertaining sounds, illumination and vibrations from said speakers, said lights and said internal motorized vibration mechanism;

a receiver communicatively coupled to said internal control module; and, a remote controller in wireless communication with said receiver.

3. The child car seat with enhanced entertainment features of claim 1, wherein said seat portion further comprises:

a handle; and, a backrest portion pivotally mated to said handle;

wherein said handle extends from opposing outer side surfaces of said backrest portion and extends laterally in front of said seat portion.

4. The child car seat with enhanced entertainment features of claim 1, wherein said child seat assembly further comprises:

a release clasp connected to said seat portion;

a release catch situated at said base portion and being removably mated with said release clasp;

a first rear latching feature;

a second rear latching feature removably engaged to said first rear latching feature;

a first front latching feature; and, a second front latching feature removably engaged to said first front latching feature;

wherein each of said first and second rear latching features as well as each of said first and second front latching features include geometrically matching pairs of interlocking stationary elements sequentially inserted into each other respectively; and, wherein said first and second rear latching features as well as said first and second front latching features are retained at an engaged state when said release clasp is engaged in said release catch respectively.

5. The child car seat with enhanced entertainment features of claim 4, wherein said release clasp and release catch are located along front surfaces of said seat portion and said base portion, respectively.

6. The child car seat with enhanced entertainment features of claim 4, further comprising: a plurality of electrical connectors situated between said seat portion and said base portion, said electrical connectors being pre-aligned and engaged in a coincidental engaging motion with said first and second front latching features as well as said first and second rear latching features respectively when said seat portion is attached to said base portion;

wherein said electrical connectors are electrically coupled to said internal control module.

7. A child car seat with enhanced entertainment features comprising:

a car seat assembly including a base portion and a seat portion removably attached thereto, said base portion including a pushbutton housing attached thereto;

a plurality of speakers coupled to said seat portion for emitting sounds and vibrations;

an internal motorized vibration mechanism situated within said base portion for generating vibrations having a variety of frequencies and corresponding amplitudes;

a plurality of lights for creating an attractive visual illumination effect, said lights including an arrangement of variegated light bulbs located along forward facing surfaces and perimeter edge portions of said seat portion respectively; and, an internal control module located within said base portion and being communicatively coupled to said speakers, said internal motorized vibration mechanism and said lights respectively;

wherein said internal motorized vibration mechanism synchronously operates with said lights and speakers respectively.

8. The child car seat with enhanced entertainment features of claim 7, wherein said pushbutton housing comprises:

a plurality of pushbuttons for generating entertaining sounds, illumination and vibrations from said speakers, said lights and said internal motorized vibration mechanism;

a receiver communicatively coupled to said internal control module; and, a remote controller in wireless communication with said receiver.

9. The child car seat with enhanced entertainment features of claim 7, wherein said seat portion further comprises:

a handle; and, a backrest portion pivotally mated to said handle;

wherein said handle extends from opposing outer side surfaces of said backrest portion and extends laterally in front of said seat portion.

10. The child car seat with enhanced entertainment features of claim 7, wherein said child seat assembly further comprises:

a release clasp connected to said seat portion;

a release catch situated at said base portion and being removably mated with said release clasp;

a first rear latching feature;

a second rear latching feature removably engaged to said first rear latching feature;

a first front latching feature; and, a second front latching feature removably engaged to said first front latching feature;

wherein each of said first and second rear latching features as well as each of said first and second front latching features include geometrically matching pairs of interlocking stationary elements sequentially inserted into each other respectively; and, wherein said first and second rear latching features as well as said first and second front latching features are retained at an engaged state when said release clasp is engaged in said release catch respectively.

11. The child car seat with enhanced entertainment features of claim 10, wherein said release clasp and release catch are located along front surfaces of said seat portion and said base portion, respectively.

12. The child car seat with enhanced entertainment features of claim 11, further comprising: a plurality of electrical connectors situated between said seat portion and said base portion, said electrical connectors being pre-aligned and engaged in a coincidental engaging motion with said first and second front latching features as well as said first and second rear latching features respectively when said seat portion is attached to said base portion;

wherein said electrical connectors are electrically coupled to said internal control module.

13. A method of utilizing a child car seat with enhanced entertainment features, said method comprising the steps of:

providing a car seat assembly by obtaining a base portion and a seat portion;

providing and coupling a plurality of speakers to said seat portion for emitting sounds and vibrations;

providing and situating an internal motorized vibration mechanism within said base portion for generating vibrations having a variety of frequencies and corresponding amplitudes;

providing a plurality of lights for creating an attractive visual illumination effect by providing and arranging variegated light bulbs along forward facing surfaces and perimeter edge portions of said seat portion respectively;

providing and locating an internal control module within said base portion;

communicatively coupling said internal control module to said speakers, said internal motorized vibration mechanism and said lights respectively;

removably attaching said seat portion to said base portion, said base portion including a pushbutton housing attached thereto; and, said internal control module causing said internal motorized vibration mechanism to synchronously operate with said lights and speakers respectively.

\* \* \* \* \*